US009065776B2

(12) United States Patent
Tran et al.

(10) Patent No.: US 9,065,776 B2
(45) Date of Patent: Jun. 23, 2015

(54) ADDRESSABLE NODE UNIT AND METHOD FOR ADDRESSING

(75) Inventors: Luan-Vu Tran, Vufflens-la-Ville (CH); Walter Hammer, Enges (CH)

(73) Assignee: RADICOS TECHNOLOGIES GMBH, Vienna (AT)

( * ) Notice: Subject to any disclaimer, the term of this patent is extended or adjusted under 35 U.S.C. 154(b) by 141 days.

(21) Appl. No.: 13/514,398

(22) PCT Filed: Jan. 25, 2011

(86) PCT No.: PCT/IB2011/000108
§ 371 (c)(1),
(2), (4) Date: Jun. 27, 2012

(87) PCT Pub. No.: WO2011/095857
PCT Pub. Date: Aug. 11, 2011

(65) Prior Publication Data
US 2013/0114614 A1 May 9, 2013

(30) Foreign Application Priority Data

Feb. 4, 2010 (CH) .......................................... 128/10

(51) Int. Cl.
| | |
|---|---|
| H04L 12/28 | (2006.01) |
| H04L 12/773 | (2013.01) |
| H04L 12/10 | (2006.01) |
| H04L 12/40 | (2006.01) |
| H04L 12/403 | (2006.01) |
| H04L 29/12 | (2006.01) |

(52) U.S. Cl.
CPC ................ *H04L 45/60* (2013.01); *H04L 12/10* (2013.01); *H04L 12/40045* (2013.01); *H04L 12/403* (2013.01); *H04L 29/12254* (2013.01); *H04L 61/2038* (2013.01)

(58) Field of Classification Search
CPC ...................................................... H04L 12/417
USPC .......... 370/201, 401; 710/110, 316; 340/14.66
See application file for complete search history.

(56) References Cited

U.S. PATENT DOCUMENTS 3,835,252 A * 9/1974 Ananiades et al. ........... 375/257
4,477,896 A * 10/1984 Aker .............................. 370/201

(Continued)

FOREIGN PATENT DOCUMENTS

| DE | 196 47 668 A1 | 5/1998 |
| WO | WO-9001245 A1 | 2/1990 |

(Continued)

OTHER PUBLICATIONS

International Search Report.

*Primary Examiner* — Chirag Shah
*Assistant Examiner* — Jael Ulysse
(74) *Attorney, Agent, or Firm* — Harness, Dickey & Pierce, P.L.C.

(57) ABSTRACT

An addressable node unit includes connections for at least two lines via which the node unit can be addressed. The connections are connected to a circuit which evaluates an addressing signal. The node unit includes at least one power source which is supplyable with power via at least one of the lines. A switch is provided in the path between the evaluating circuit and the corresponding line connection, the switch being opened after an addressing process so that the power supply of the evaluating circuit is ensured by the at least one power source after the addressing.

18 Claims, 8 Drawing Sheets

(56) References Cited

U.S. PATENT DOCUMENTS

Figure 1:
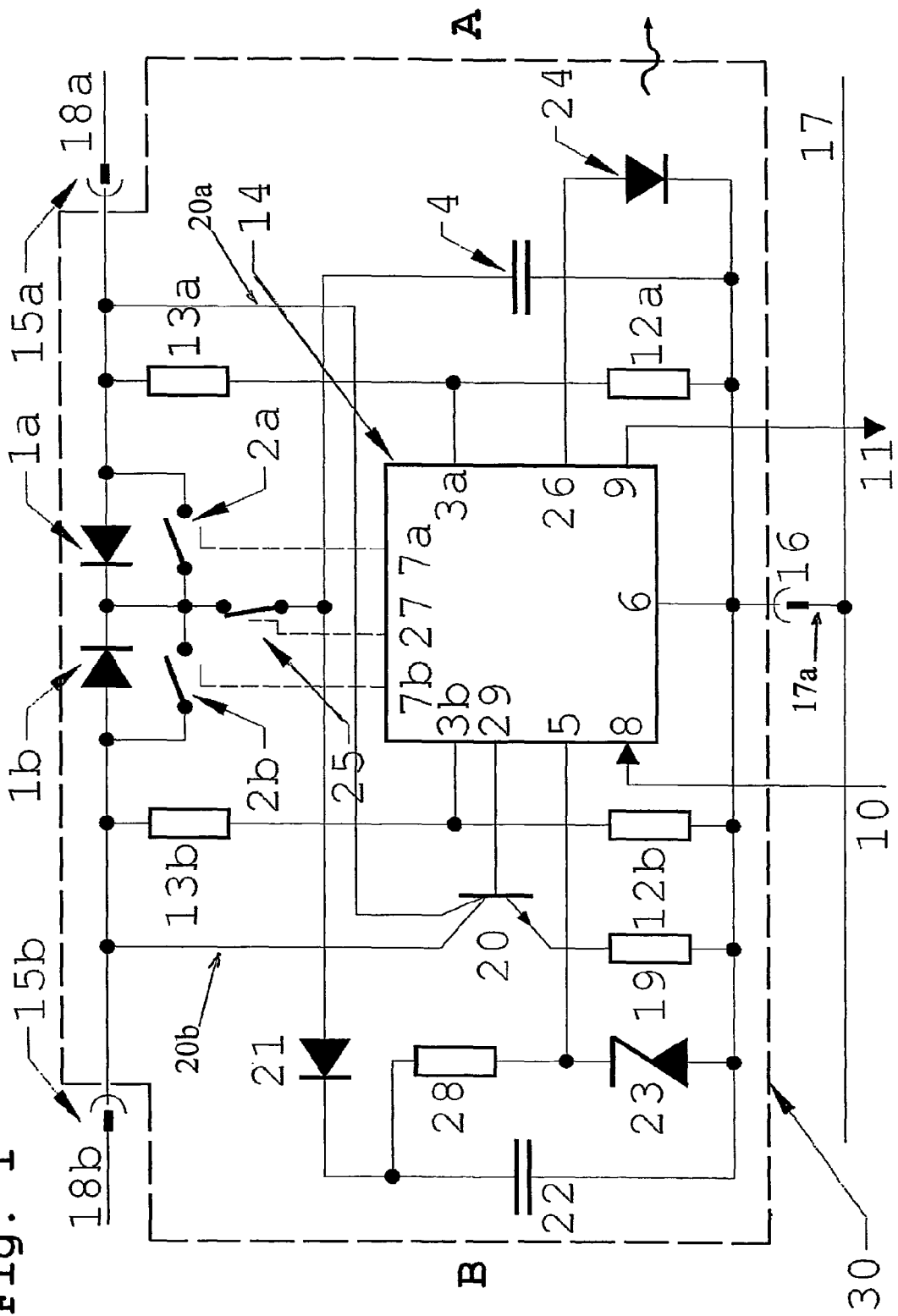

| | | | | |
|---|---|---|---|---|
| 5,226,123 A | * | 7/1993 | Vockenhuber | 710/316 |
| 5,450,072 A | * | 9/1995 | Vockenhuber | 340/9.1 |
| 5,469,000 A | * | 11/1995 | Geysen | 307/39 |
| 5,889,391 A | * | 3/1999 | Coleman | 323/271 |
| 6,397,280 B1 | * | 5/2002 | Nitschke et al. | 710/110 |
| 7,208,077 B1 | * | 4/2007 | Albers et al. | 205/782 |
| 7,443,145 B2 | * | 10/2008 | Hackner et al. | 323/224 |
| 2002/0022935 A1 | * | 2/2002 | Murphy et al. | 702/60 |
| 2003/0151418 A1 | * | 8/2003 | Leger | 324/715 |
| 2004/0056311 A1 | * | 3/2004 | Deboy et al. | 257/368 |
| 2006/0025892 A1 | * | 2/2006 | Leung et al. | 700/293 |
| 2007/0040657 A1 | * | 2/2007 | Fosler et al. | 340/333 |
| 2007/0236848 A1 | * | 10/2007 | Mayell | 361/93.1 |
| 2009/0194698 A1 | * | 8/2009 | Onakado et al. | 250/338.1 |
| 2009/0243564 A1 | * | 10/2009 | Kajita | 323/234 |
| 2011/0103393 A1 | * | 5/2011 | Meier et al. | 370/401 |

FOREIGN PATENT DOCUMENTS

| | | |
|---|---|---|
| WO | WO-2005024749 A2 | 3/2005 |
| WO | WO-2009065236 A1 | 5/2009 |

* cited by examiner

ADDRESSABLE NODE UNIT AND METHOD FOR ADDRESSING

The invention relates to an addressable node unit according to the introductory part of claim 1. Such a node unit has, for example, become known from WO 2009/065236, which should be considered to be disclosed here by reference. Node units of this kind serve either as sensors (i.e. they contain it) to monitor exactly the occurrence of an event and the location of this event, wherein generally a plurality of such node units are arranged at distances from one another for this purpose along a cable or bus. However, it may also the question of a case, where the respective node unit carries out a control at a certain place, for example opening a valve for spraying fire fighting water, or it actuates a room partition, e.g. a fire protection curtain, thus in each case serving as an actor (this term hereafter shall be used, in general, for such actuations).

In the above prior art, nothing is disclosed regarding the manner of addressing. However, mainly two addressing systems are used up to now: Either an, e.g. binary, address is associated to each node unit, which is called with a corresponding, e.g. binary, signal by a controller, such as a microprocessor, a computer or the like. A simplified approach provides an addressing signal, the amplitude of which changes by line resistance losses in such a way that the amplitude itself can be used for addressing.

While the first mentioned addressing system is somewhat sumptuous, the second one cannot be employed without additional measures for branched lines and is, moreover, not adapted to transmit the address in a digital way.

Therefore, the invention is based on the object to provide a node unit adapted to obtain a digital address signal, wherein addressing should suitably be simplified, but above all it should be ensured, that the respective evaluating circuit is supplied sufficiently with current even in non-operating state. According to the invention, this is achieved by the characterizing features of claim 1.

The switch actuated by the address signal, which can be totally simple and does not need an address code, ensures that the address signal initially reaches the respective first node unit in a row of such units, but passes then, at the next time, the address signal to the next node unit. At this moment, however, the first node unit, without additional measures, would be cut off the current supplying line. To ensure a minimum supply, nevertheless, the at least one current storage is provided.

This current storage, in principle, could be an accumulator or a chargeable battery, but as preferred is formed by at least one capacity, preferably by at least one condenser. If a difference is made here between a capacity and a condenser, the first term should be understood in general to encompass everything adapted to build-up a capacity large enough to provide the required current. This may be, for example, also an accumulator circuit (a chargeable battery).

In order to ensure that the stored current suffices really for the supply of the evaluating circuit during the period up to the next addressing of itself, the node unit comprises advantageously a switch over unit between the lines and the evaluating circuit, by which current consumption of the evaluating circuit may be reduced after opening of the switch actuable by the address signal.

According to another aspect of the invention a method for addressing one of at least two node units explained above is developed in such a way, that a first signal is emitted for addressing by a controller which reaches the first node unit, in which the first signal is supplied to the evaluating circuit, while passing this first signal to the second node unit is interrupted, after which the controller emits a second signal, different from the first one, by which the connection to the next node unit is established, but at the same time or beforehand the address signal path to the evaluating circuit of the first node unit is interrupted, so that the addressing first signal of the controller addresses now the second node unit, and that finally the connection between the controller and the evaluating circuit of the first node unit is reestablished finally for next addressing. With this method, in comparison with the prior art, outstandingly fast addressing is possible.

Figure 2A:
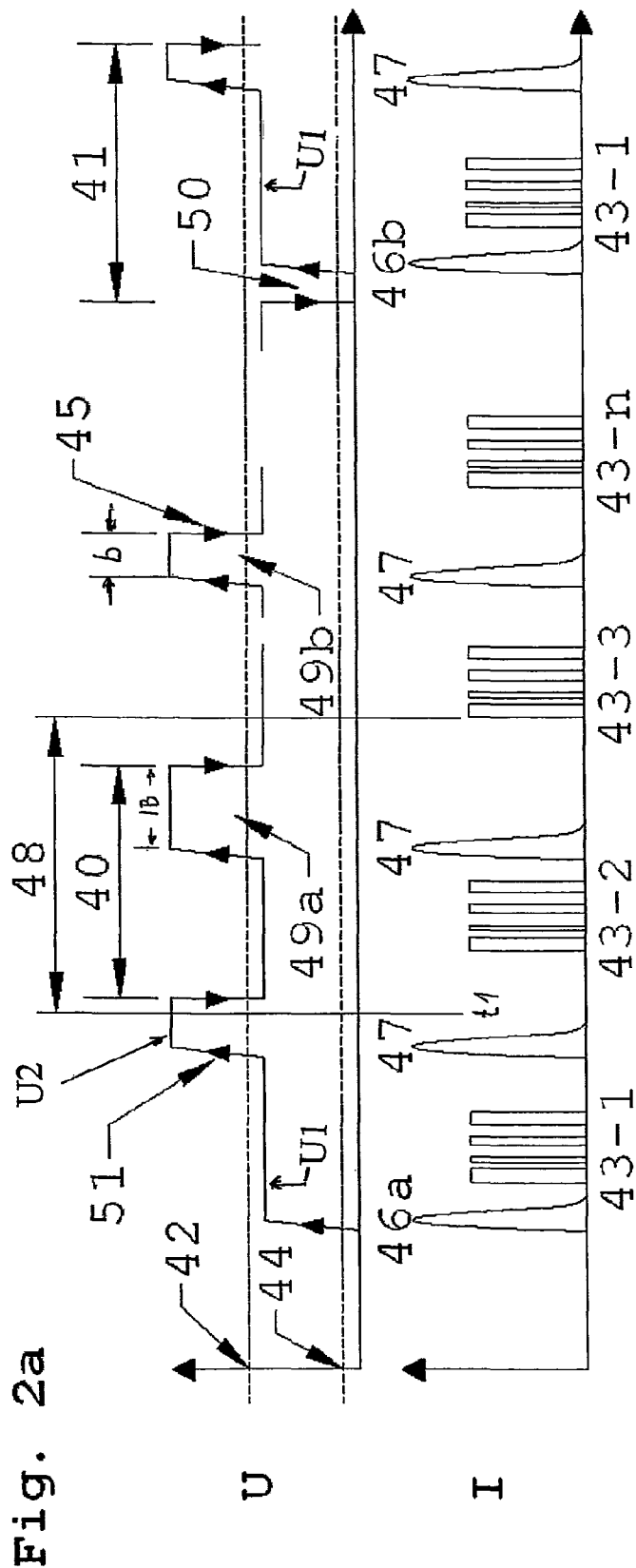
Figure 2B:
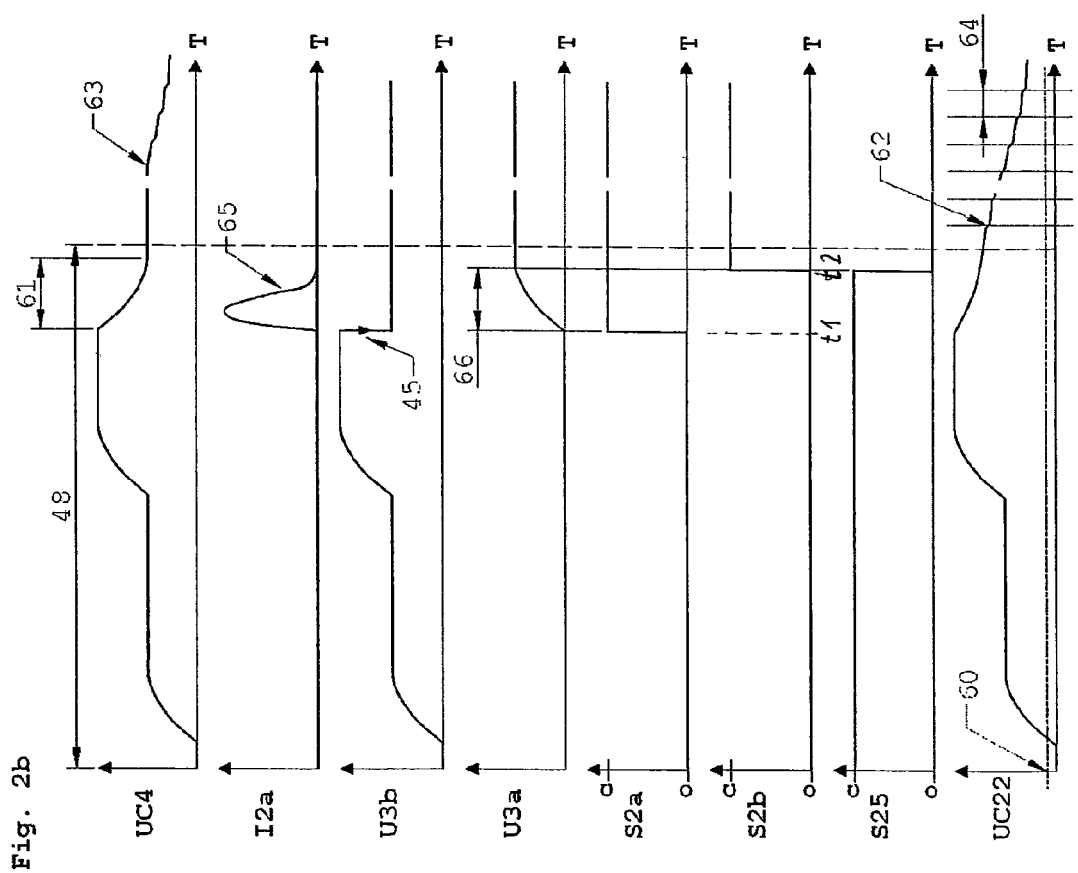
Figure 3:
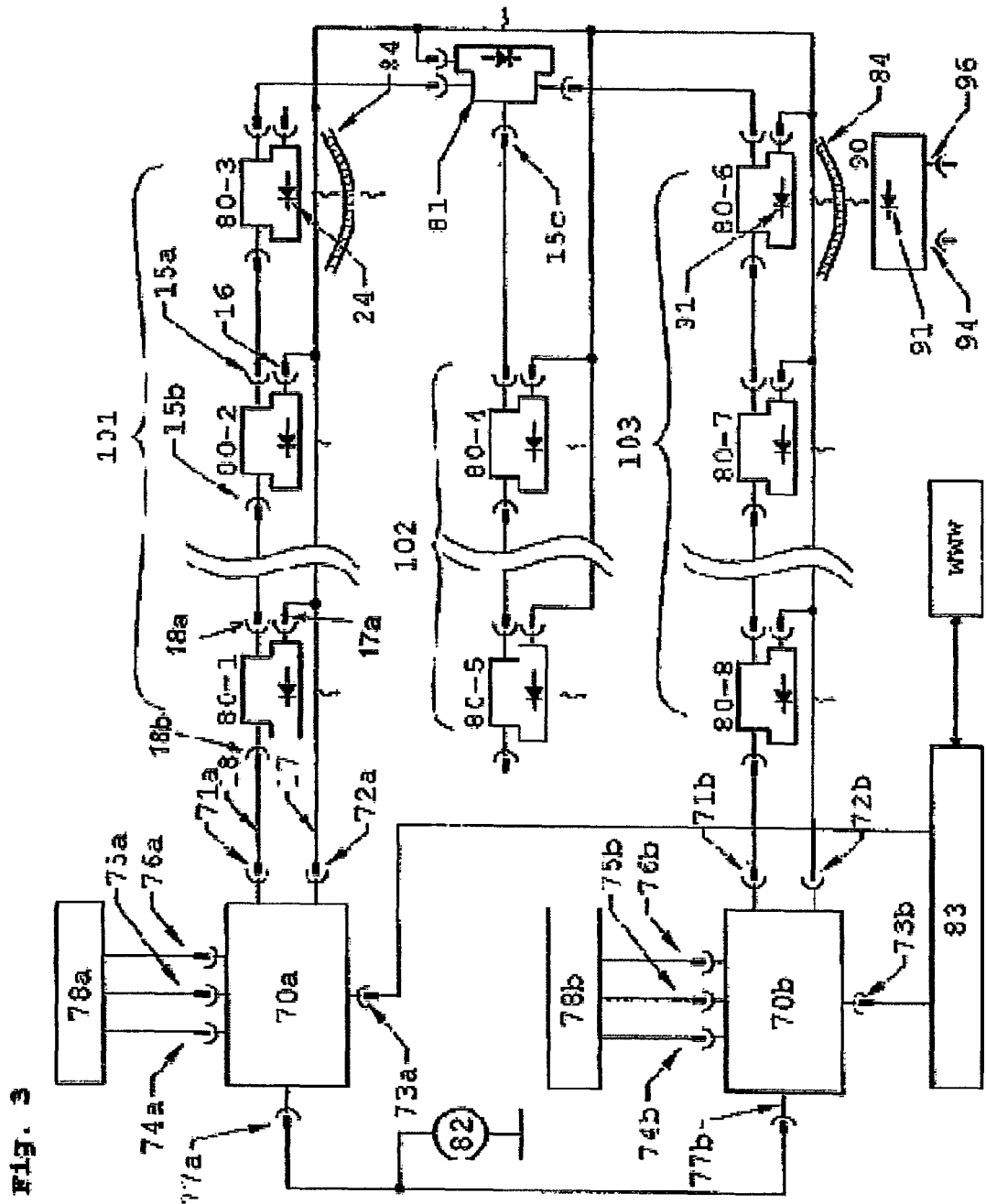
Figure 4:
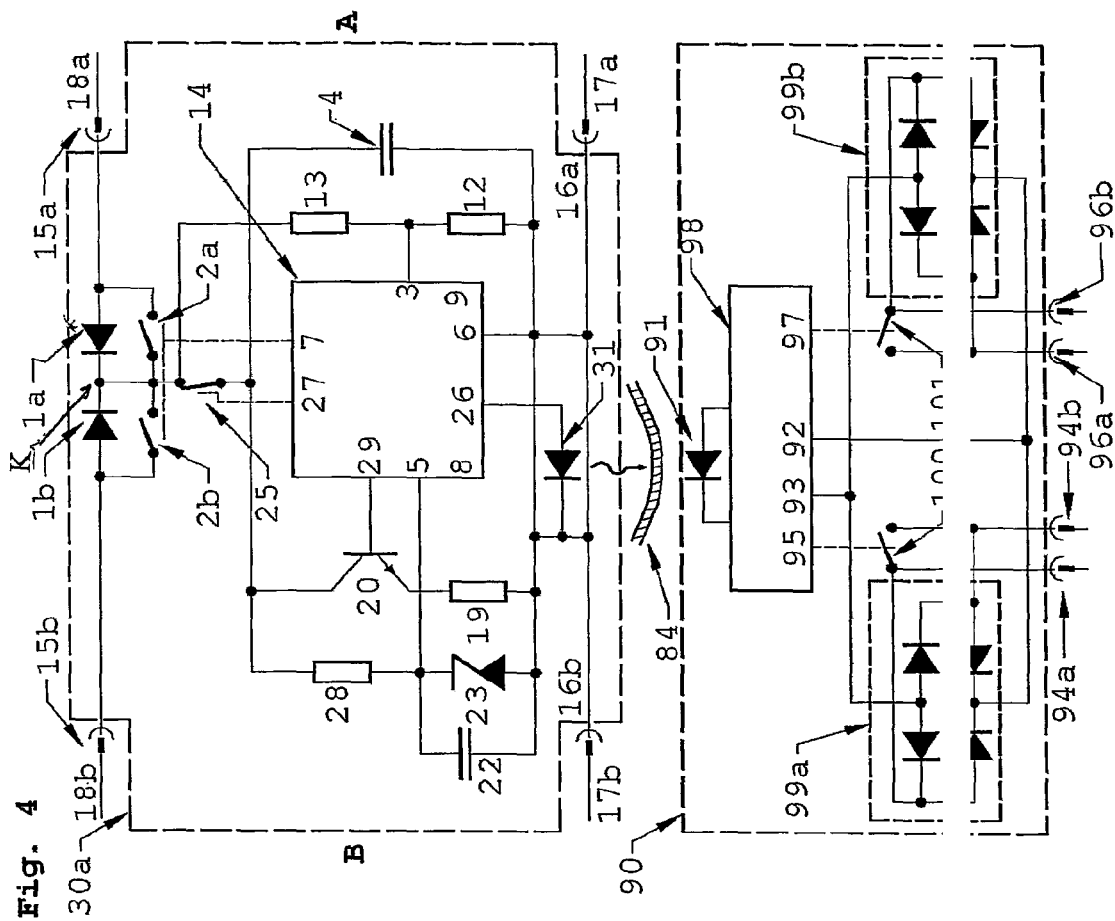
Figure 5:
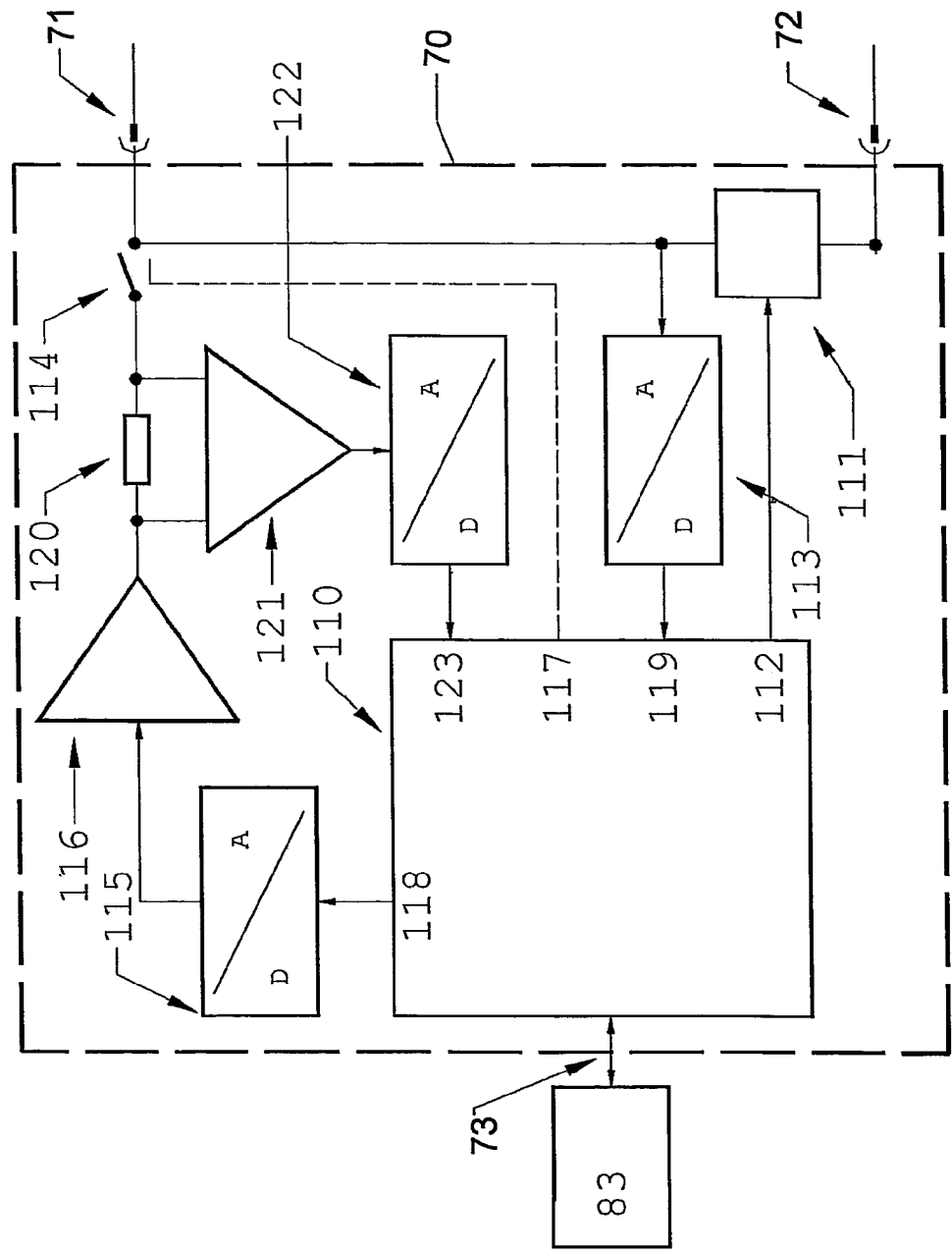
Figure 6:
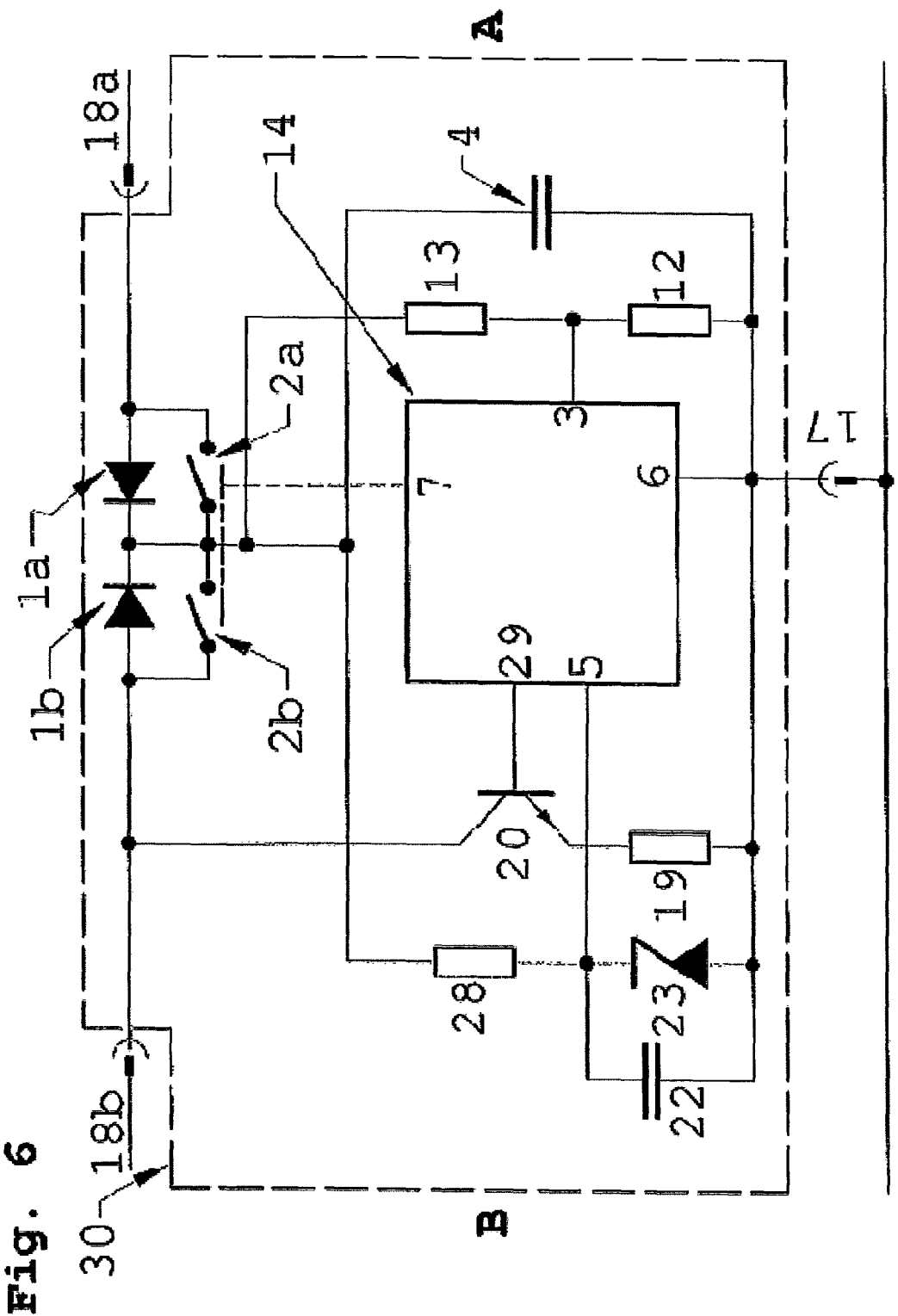

Further details of the invention will become apparent by the following description of a preferred embodiment schematically shown in the drawing. There is shown in:

FIG. 1 an embodiment of a node unit according to the invention;

FIG. 2a the voltage (U) and current diagrams of the signals going over the lines 17, 18 of FIG. 1;

FIG. 2b the signal shapes at individual components of the circuit of FIG. 1;

FIG. 3 several node units being in series in a two wired line and being addressed one after the other by at least one controller;

FIG. 4 a variant to FIG. 1 in the particular application as an actor; and FIG. 5 a preferred circuit diagram for a controller;

FIG. 6 variants of the embodiments of the switches; and

Figure 7:
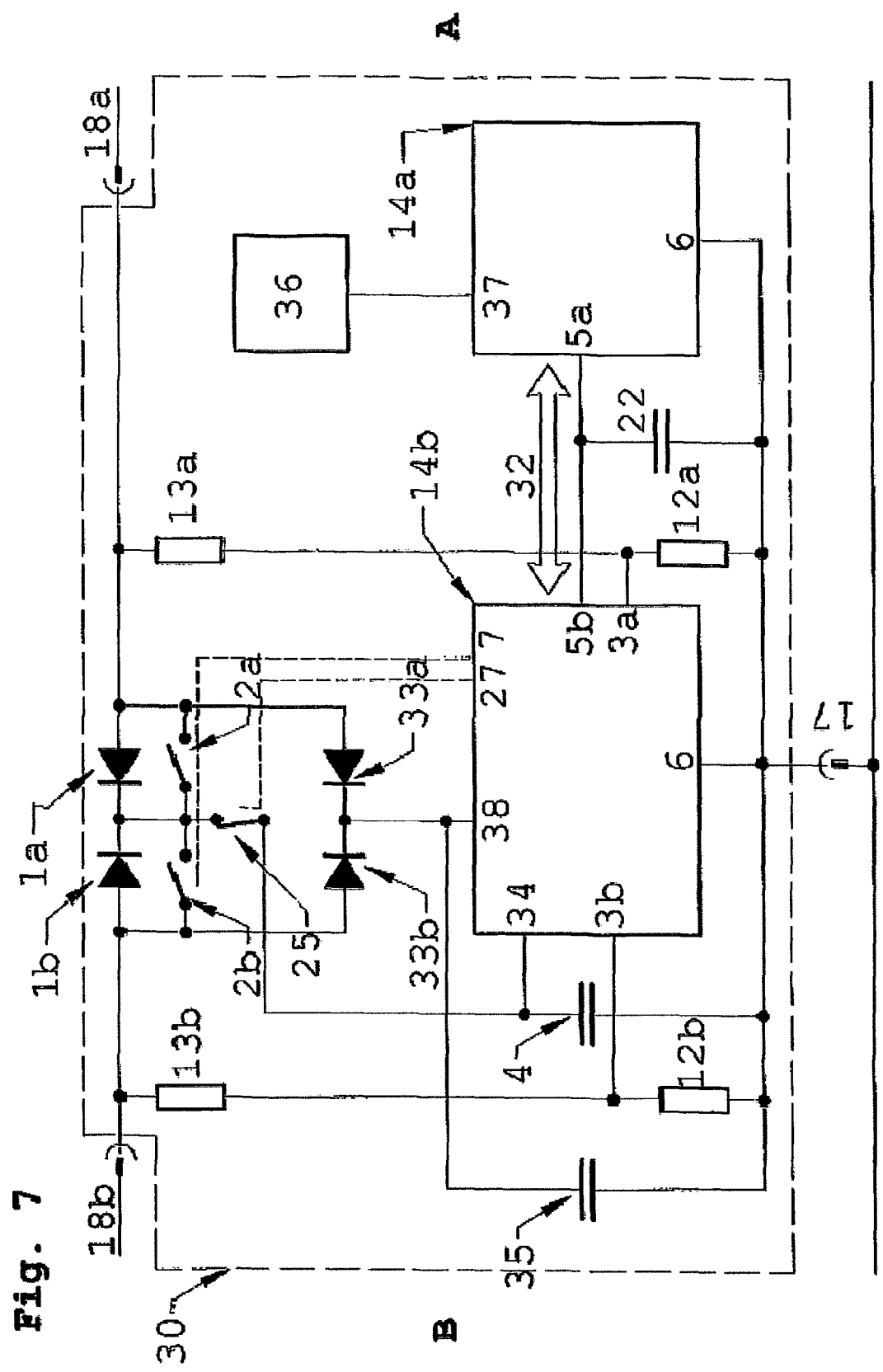

FIG. 7 an embodiment of the invention comprising double switches and current storages.

In FIG. 1, signal lines or connections 18a, 18b, or at least the signal line 18b of them, are connected to a controller not shown (70a or 70b in FIG. 3, e.g. of the type of LUMINARY MICRO of the company of Texas Instruments). These lines 18a, 18b correspond to the respective side A or B of this sensor circuit or node unit 30. The circuit 30, as may be seen, is preferably removably connected to the connections 18a, 18b as well as to a negative signal line 17 via plug connections 15a, 15b and 16, as is explained in detail in a patent application simultaneously filed by the same applicant. It will be understood, that the function of the lines 17, 18a, 18b may, of course, be reversed, i.e. that the line 17 has positive voltage and the lines 18a, 18b the negative one. It will also be understood that the lines 17, 18 are suitably shielded. In this context one refers also to the patent application simultaneously filed by the same applicant.

In some embodiments, it may be advantageous, if the lines 18a, 18b are only connected via plug connections, while the output 6 is directly connected to the negative line 17, for example being soldered, because in this way possible tensile stress in longitudinal direction has no effect to positioning of the node unit. Of course, the invention is not limited to plug connections, and plug connections 15a, 15b may rather be omitted. But even with the arrangement of a plug connection 16, it is advantageous, if it is via a branch line 17a, as shown, so that the line 17 is uninterrupted, thus being able to absorb tensile stress.

The line 18a may either be connected to another controller (70b in FIG. 3) or in a circuit to the same controller (70a in FIG. 3) so that this latter query measuring data via one or the other line. This corresponds about to an operation as described in WO 2009/065236. Alternatively, the circuit 30, via connection 18a, is connected to a further (or different) sensor and/or actor circuit, and the controller addresses these circuits one after the other to obtain their measuring data, as it has been done already up to now.

The connections 18a, 18b represent here a bus and, for example, carry a positive signal in relationship with the signal of the negative line 17. The respective signal is, thus, sensed between these lines 17 and 18a, 18b. Addressing is done via a changeover switch device 1a, 1b, 2a, 2b and 25 which, with opened switches 2a, 2b and closed switch 25, carries a signal only from the controller (e.g. 70a in FIG. 3) via the diode 1b, open in this direction (diode 1a blocks), and through the closed switch 25 to an evaluating device 14. This evaluating device delivers output signals, corresponding to its measurements, via outputs 26 and/or 29, after which the switches 2a, 2b are closed, but switch 25 is opened, preferably on command of the controller, but optionally by a time circuit within the evaluating device 14, so that the next enquiry signal of the controller arrives from connection 18b, via switches 2a, 2b, at connection 18a and from there at the next node unit to be dialed, having, in principle, the same changeover switch device 1a, 1b, 2a, 2b and 25, so that an immense number of such modules 30 (in FIG. 3 designated 80-1 to 80-8) are connected in series and are able to be addressed in a simple manner. In practice, the switches 2a, 2b, 25 will be electronic switches, such as transistors, particularly FET transistors or MOSFETs.

Furthermore, switches, in the sense of the invention, shall be meant to be electrical components, in general, which block in at least one direction, and may be opened by signals. For a more detailed description of these signals and components an their control, it is referred to FIGS. 6 and 7.

The node units 80-1 to 80-8 may be formed uniformly and, preferably, like the node unit 30 shown in FIG. 1, or they are each different, for example so that an infrared (heat) sensor follows a photo-electric presence sensor. Because the controller is able to determine by addressing, which node unit it is facing and how the signal, coming from it, has to be judged or to be treated.

Changing over the switches 2a, 2b and 25 could, in principle, be effected under time control, from receipt of an addressing order from the controller on, by a clock generator of the circuit 14 or by a program contained in the circuit 14, but it is preferred, if changeover is made by the controller and a signal delivered from it, as will be discussed below with reference to FIG. 2a. If such a changeover signal appears, the switches 2a, 2b are correspondingly controlled via control outputs 7a, 7b, and switch 25 via a control output 27. For sensing, whether such a changeover signal from the respective controller is present, voltage dividers 12a, 13a and 12b, 13b are provided, which sense the voltage existing between the lines 17 and 18. These voltage dividers, thus, contact permanently the lines 18a, 18b, separated from one another by the diodes 1a, 1b, so that they receive voltage signals even when switches 2a, 2b are closed and switch 25 is opened, in order to enable addressing the respective next node unit. By the presence of two voltage sensors 12a, 13a and 12b, 13b, the voltages in the lines 18a and 18b can be sensed at both sides A and B independently from one another, and in dependence on the direction from which an address signal comes, as will be discussed later with reference to FIG. 2a, the sensor signal processed by the evaluating circuit 14 will be sent, as far as two directions are really provided, for example to reach different controllers 70a, 70b (FIG. 3), to which, however, the present invention is not limited, since it could work also with signal transmission in one direction only. In this case, changeover device 1a, 1b, 2a, 2b, and 25 is, of course, simplified. The evaluation circuit is absolutely able to recognize, where (side A or B) an address or control signal is present and where not, and is able to send the processed sensor signals correspondingly in the appropriate direction. A favorable solution, which does without additional changeover switches, will be discussed later with reference to modulator transistor 20.

If the output 26 is utilized, it drives a diode circuit 24 (only one diode is represented), so that it releases, for example as an actor, an operation, as will be described in detail with reference to FIG. 4. However, it would also be possible, to provide here a driver output for a display to make the measurement visible to the exterior. The related measurement signal from a sensor element (not shown), via an inlet line 10, reaches the inlet 8 of the evaluating circuit 14, whereas a further signal output 9 is connected to an output line 11. These lines 10, 11 may be a positive and a negative line each being connected to the sensor element 10a. The light emitting diode 24, for example, may emit in the infrared range. It is favorable, if the coating of the lines 17, 18 is transparent or light transmissive so that in the case of a failure and after switching the diode 24 on, the place is optically easy to determine in the case of an inspection by a custodian. Susceptibility is particularly enhanced, if the evaluating circuit 14 activates the diode 24 intermittently, so that it emits blinker light (function of an a stable multivibrator within the circuit 14).

Of course, other light sources or actor circuits, for example using a relay, are also conceivable, but the use of a diode is structurally more favorable. To wit, the diode is able to emit also modulated signals, and by a corresponding circuitry of the evaluating circuit 14 it could be used to emit sensor data through a light-electric transducer or via an optical conductor, such as a fiber optical waveguide, receiving its light signals. In such a case, the diode could emit a pulse frequency and/or pulse width modulated light beam, wherein the diode is either placed at the surface of the circuit 30 or in a light transmissive casing or by connecting it from the interior via a light guide to outside. The light beam of the diode 24 is preferably in the infrared range.

The sensor connected to the line 10 may be of any kind, such as a temperature sensor of known type, if the temperature should be monitored, or a metal sensor (capacitive, inductive or the like), to determine the occupancy of a parking house with cars, a humidity sensor to determine a leakage, and so on. Instead of a sensor placed outside, which delivers its signals over the lines 10, 11 to the evaluating circuit, the sensor may also be incorporated into the circuit 14.

A particular form of a sensor element may be the form of a sensor for measuring distortions of the geomagnetic field, for example to determine undesirable deformations of a pipeline. In this connection, the node units are mounted alongside a ferromagnetic object, for example a pipeline, where relative movements between the metered value transducer and the ferromagnetic object cause changes of the geomagnetic field at the place of the node unit. In this arrangement, the metered value transducer and the ferromagnetic object are mechanically fixed independently from one another. Such sensors, however, may also be used for other pipes, such as water pipes or gas pipes, sewage networks and also for managing parking houses.

It should be noted, that the signal lines 10, 11, if provided and if the sensor here not shown is not incorporated into the circuit 14, are, of course, insulated from the potential of the lines. This may be done in a manner that the signal lines are formed as optical conductors, whose transmitted light is controlled from a LED (similar to LED 24) controlled by the sensor signal, and at its output, this light is supplied in an analogous way, i.e. via a photoelectric transducer, as a voltage to the positive and negative input 8 and 9.

A modulator connection 29 serves for delivering a signal modulated in correspondence with the metered value (43-1 to 43-n in FIG. 2a), which comes through the line 10, via a modulator transistor 20 to the bus (connection 18b) and to the controller, which evaluates this signal in a conventional manner, for example to determine, whether unacceptable heating occurs in the region of a predetermined sensor module 30 (in the case of metal detectors, whether a car sheet exists in the region of the corresponding module). Because as long as the node unit 30 receives a first signal, for example a voltage being below a certain value, the evaluating circuit 14 transmits data of the sensor, connected to the line 10, which it has received via input 8. This transmission is done by absorbing a certain rate of power by an absorbing resistor 19 and by modulating it by a modulator circuit, here in the form of the transistor 20.

In the present example, the modulator circuit is illustrated as a transistor comprising two collectors. This embodiment permits to send the modulated output signals in two directions A and B, if necessary, if both sides are connected to one controller or to a controller 70a, 70b each, as in FIG. 3. Such an embodiment corresponds about to the teaching of WO 2009/065236 already mentioned, to which reference is expressively made. However, it would also be possible to provide only one collector of the transistor 20, which is about connected to the contact in common of the diodes 1a, 1b.

If now the normally open switches 2a, 2b are closed and the normally closed switch 25 is opened, the measuring circuit 10, 11, 14 is practically disconnected from voltage, which it necessitates for further functioning. To solve this problem, at least one current source or an energy storage facility is provided, here in the form of two condensers 4 and 22. Alternatively, accumulators may be used, which (like the condensers 4, 22 here). In this connection, it is advantageous, if changing over of the switches 2a, 2b and 25 is not effected exactly simultaneously, but that in the first instance either both switches 2a, 2b are brought from the opened situation into the closed state, the switch 25 remaining still closed, or that at least the switch 2a is firstly closed, as will be explained later with reference to FIG. 2b. In this way, a charge from condenser 4 is delivered to line 18a and to the next node unit (referring to FIG. 3, for example, from node unit 80-1 to node unit 80-2), and addressing of this latter can be made very quickly. Condenser 22 remains unaffected from this "delayed" opening of the switch 25, because a blocking diode 21 is between it and switch 25. The amount of this time difference between closing the switches 2a, 2b and opening the switch 25 depends on the dimension of the condenser 4, i.e. which charge can be transmitted in which time, and from the demand of charge of the next node unit to be dialed. Therefore, the condenser 22 in cooperation with the diode 21 can be called a "charge pump".

Thus, having opened the switch 25, the residual current from condenser 4 can be combined with the charge of the maximally charged condenser 22. Both condensers 4 and 22 are practically isolated from lines 18a, 18b after opening the switch 25 and, therefore, do not affect the rate of data transmission between the controller (70a, 70b in FIG. 3) and the respective node units.

In order not to be forced to make the current sources 4, 22 too large, it is suitable, if the circuit can be switched over to a "sleep" mode, i.e. a mode of operation with smaller current consumption. This can be effected by a program present in the circuit 14 or by a clock generator therein (e.g. with a counter which, after a certain number of clock signals after opening the switch 25, switches over to this "sleep" mode), but preferably it will be released by a "sleep" signal of the controller. After opening the switch 25, this signal may and will also be received by the voltage dividers 12a, 13a and 12b, 13b. In this "sleep" mode, the circuit 14 is supplied with relative lower current via a Zener diode 23 with resistor 28 between the two sides of the condenser 22, the condenser 22 discharging itself as far as it has reached the residual voltage of condenser 4, after which this latter supplies this residual voltage to the former one via blocking diode 21 as a further provisioning reserve. Thus, the evaluating circuit has enough energy at disposal up to the next addressing cycle. It should be noted that the capacitive charges of the condensers 4 and 22 are completely isolated from the lines 18a, 18b, when the switch 25 is opened, and cannot affect the signal transmission.

Thus, this evaluating circuit is able to collect data of the sensor element, even if it is not addressed. To evaluate these data, the circuit 14 possesses preferably a data memory, where the sensor data are memorized, so that the modulator circuit 19, 20 operates only when the node unit 30 is dialed again by the controller (70a, 70b in FIG. 3). In this period, a pretreatment of data may quite take place, for example forming a mean value over a certain period (e.g. the period up to new addressing), or maximum/minimum determination, so that processing by the controller can be done more quickly.

If one looks at FIG. 2a in comparison with the circuit according to FIG. 3, the voltage U is plotted over time in the upper diagram of FIG. 2a, whereas in the lower diagram, the current of the current signals delivered from the circuit 30 is shown over time. If now the controller 70a (FIG. 3), for example, delivers a first signal for addressing or dialing the first node unit 80-1, it responds by outputting the measured sensor signals via the modulator circuit 19, 20 (alternatively or in addition via diode 24, which however is preferably conceived to provide data, as described above) shown in FIG. 1. The first signal, according to FIG. 2a, is simply a lifting of the voltage U1 delivered from the controller 70a, which then lies above a reset level 44, but suitably below a higher level 42. In principle, however, this addressing signal may be of any kind, for example a sequence of pulses of predetermined frequency (which is less preferred, because this frequency had to be determined in the circuit 30), or it could be a decrease of voltage from a higher level (which is also less preferred) and so on. The signal U1 is sensed in the node unit 30 by voltage or signal sensors 12b, 13b, and is delivered to the circuit 14 via input 3b. The current sources 4, 22, generally, are dimensioned so that they have practically all their charges delivered at this moment.

With the increase of voltage to the value of U1 (vide the narrow pulse 49b), the inquiry about sensor data from the first node unit 80-1 (FIG. 3) is initiated, and in this example it begins first with a reset signal 46a for charging the condensers 4, 22 (FIG. 1), which results from lifting the voltage to level U1. Subsequently, a data package 43-1 is transmitted to the controller 70a via lines 17 and 18b (FIG. 1), which encompasses the above-mentioned data from the evaluating unit 14 via the modulator circuit 19, 20.

When the data package 43.1, optionally with a signal "end of transmission" at the end, has been transmitted, the controller 70a, optionally after a safety time delay, sends a second signal which, in principle, may freely be chosen, but preferably consists of a higher voltage pulse of a predetermined first pulse width, which is reached over a rising flank 51. The rising angle of this flank 51 depends on the charge emitted by the controller 70a and on the impedance and length of the lines 17, 18a, 18b as well as on the output impedance of the driver circuit used by the controller 70a.

This new voltage rising leads to charging the condensers 4 and 22 to their maximum charge, which results in a strong current pulse 47 that is obtained by the controller 70a. From a moment t1 on switching over of the switches 2a, 2b, 25 is effected ("delayed" opening of switch 25 may be produced by the circuit 14 and its control output 27) and the transmission of charge from the condenser 4 to the next node unit 80-2, as has been described above. Now, within a time segment 48, an analogous activity begins for the next node unit 80-2 (FIG. 2), more precisely from the de-energizing flank of the signal U2, which drops now below the level 42 (cf. flank 45) within a time period 40. This voltage drop 45, in the circuit of FIG. 1, is clearly defined by the diodes 1b and 22, because the diode 22 isolates a higher voltage in the current source 22, and the diode 1b takes the same task over for current source 4. Thus, as may be seen from FIG. 2, the voltage drop 45 gives a precise time reference for the period 40 of the addressing cycle. This includes also the charge transmission from the condenser 4 to the next node unit, which is able to charge its condenser 4 by closing the switch 2b (or when inquiring from the direction A, the switch 2a), when the switch 25 is closed. It is only then, that the respective other switch 2a (or when inquiring from the direction A, the switch 2b) is closed. As has been mentioned, the switch 25 is opened by then.

The signals U1, 2, 49a, 49b are particularly simple and simple to realize, but in principle, all control signals known according to the prior art may be used, e.g. specially modulated signals, binary signals and so on. However, it is apparent that than corresponding decoders would be required instead of the simple signal recognizing circuit 12, 13.

As may be seen from the lower diagram, a data package 43-2 is sent from the node unit 80-2 to the controller 70a, from the end of which on, the controller 70a emits a third signal 49a, because the controller 70 has recognized the necessity of an action at the place of the node unit 80-2 by the data package 43-2.

This third signal 49a consists of an increase of voltage anew to the value of U2, but in this example with significantly increased pulse width IB in comparison with the pulse with the flank 51. Pulse width will be understood by the node unit, for example, as one bit of an information, which causes the evaluating circuit 14, that senses this pulse 49a via the voltage divider 12b, 13b (FIG. 1), to switch diode 24 on, which by then releases one of the above-mentioned actions.

As becomes further apparent from FIGS. 2a and 3, addressing the respective next node unit 80 is released by pulses 49b. When addressing has arrived at the end of a line or of a bus, all node units 30 are practically isolated by opening their switches 25. To reset them to the initial state, the controller 70a makes the voltage to drop sharply below the level 44 or to zero, as is shown at 50. The switches 25 opened at this moment in all node units 30 (or 80-1 to 80-8 and 81 of FIG. 3) ensure that the decrease to zero cannot cause the current sources 4, 22 to drain them-selves.

In this way, the condition shown in FIG. 1 with opened switches 2a, 2b and closed switch 25 is reached again, because just these switches 2a, 2b are formed as being normally open, while the switch 25 is formed as being normally closed. Following the decrease 50, one can see that then a new increase is effected up to the voltage U1 for the inquiry of the first node unit 80-1, after which the cycle is repeated.

It may be desired that the controller, which knows by the repeated addressing, how many node units are connected to the cable 17, 18, compares it with a memorized nominal number. The controller, if desired, may also send a fourth configuration signal, for example to obtain information from the node units about their serial number and their type, wherein the latter will be of particular interest, if several different sensor node units are provided along the cable 17, 18. Such information will also be recommended, if the configuration of the cable is changed, for example if new node units are added.

Thus, by emitting different signals, the controller 70a may release different responses of the node units, for example it can cause them to change the evaluation algorithm, it may switch off individual node units 30 (e.g. by permanently closing the switches 2a, 2b) or activate them, the former particularly in the case, if a node unit has turned out to be defective. For example, it may be of interest for changing the inquiry cadence, first to inquire possibly only each second node unit, and to switch on all node units (i.e. to open switches 2a, 2b with closed switch 25) only then, if a local region should be examined specially carefully, e.g. because there an adjacent node unit has emitted a suspect signal. On the other hand, it may be suitable in en emergency case, where the location of a fire has been recognized, to switch off those node units which are remote from this place, in order to be able to monitor the place of fire more frequently and with a higher inquiry cadence. In the case of equipping the node units with presence sensors for supervision of a building, the number of operating node units could be reduced, if the building is occupied by its inhabitants.

In the above explanation of operation and inquiry of the node units, the data packages 43 have been mentioned. However, it is still quite possible to shorten the inquiry period, if the evaluating circuits 14 them-selves carry out a comparison of the mean values of a long period with the actual signals of a sensor element (at the lines 10, 11) and send only then a particular token to the controller, if a significant deviation from the means value occurs.

A further possible program in the circuit 14 may be structured in such a way, that with decreasing current of the current sources 4, 22 below an admissible value, the evaluating circuit itself closes the switch 25, to fill the capacity anew so that they can maintain their "sleep" mode.

FIG. 2b shows the voltages and logic states occurring at different components of the (preferred) circuitry of FIG. 1. In this connection, the driving voltage respectively is that illustrated in FIG. 2a, so that the period 48 of FIG. 2a is also shown in FIG. 2b. Both FIGS. 2a and 2b represent the development of voltages for the node unit 80-2, about which it has already been said above, it receives a signal command 49a for releasing an action due to a signal indicating an irregularity.

Thus, FIG. 2b shows as the uppermost diagram the development of voltage UC4 over time T at the condenser C4 during an addressing cycle. Having a look to the about rectangular signals U1, 49a, 49b of the controller 70a, they reflect them-selves in the course of the diagram UC4, but due to charging of the condenser 4 (and of condenser 22) with somewhat delayed ascent. This is also the case with diagram U3b for the voltage, which reaches the input 3b of the circuit 14 with the charging time 66. On the other hand, the voltage drop 45 (FIG. 2a) reflects itself likewise sharply in diagram U3b, because the diode 21 prevents the condenser 22 from discharging. This sharp voltage drop 45 is passed by the voltage sensor 12b, 13b (or, in the case of signal emission from controller 70b from direction A, by voltage sensor 12a, 13a) to the inputs 3a or 3b of the evaluating circuit 14, which carries out switching over of the switches 2a, 2b and 25.

As has been described above with reference to FIG. 1, switching of the switches 2a, 2b and 25 is not simultaneous. This is shown with reference to diagrams S2a, S2b and S25 (on the ordinates of diagrams S2a, S2b and S25, "c" signifies the closed condition, "o" the open condition), switching the switches 2b and 25 occurring in this embodiment about simultaneously. However, the choice of the moment may be different depending on dimensioning the voltage sources 4, 22 and on the requirements of the circuit 14. In the case represented in FIG. 2b, the switch 25 opens (diagram S25) simultaneously when switch 2b closes (diagram S2b) at a moment t2.

If the voltage sensor in the form of the voltage divider 12b, 13b determines the increase of the voltage delivered to it by the controller 70a and the subsequent voltage drop 45 (vide FIG. 2a), the switch 2a will be closed. With closing the switch 2a, a charge current 65 results in diagram 12a, which reaches the condenser 4 via switches 2a and 25 for charging it, and via diode 21 at best also condenser 22. However, if the voltage drop 45 comes from the other side, i.e. from the controller 70b, the sequence of opening and closing, particularly of the switches 2a, 2b, will be inverted.

However, the sequence, as has already been mentioned, may also be chosen so that both switches 2a, 2b are closed at the moment t1, and the switch 25 remains still closed up to the moment t2. In this case, a transfer of part of the charge of condenser 4 to the corresponding condenser of the next node unit (e.g. 80-2) will result, provided that the control of the switches occurs in the manner shown in FIG. 2b.

The voltage signals at the inputs 3a, 3b are, in principal, equal, but time-shifted. At the moment of voltage drop 45 (diagram U3b), the voltage at the input 3a is near or equal to zero. After receipt of the addressing signal 45, the switch 2a will suitably open first. As soon as this has been effected, the voltage of the condenser drops with a response time characteristic for it (period 61), by which the respective next node unit (e.g. 80-2) may be charged with current pulse 65 (diagram I2a) in the manner already described. With it, however, voltage also increases during a period 66, i.e. the period between the moments t1 and t2, at the input 3a (diagram U3a). The definite signal shapes of the charge transfer pulse 65 and of the voltage drop in period 61 (diagram UC4) depend on several factors, such as the resistance of the (electronic) switches in closed condition, the properties of the components chosen for the node unit 30 and the resistance of the lines 17, 18a, 18b. This, in turn, influences the time 66 required for the charge transfer, provided one operates with a non-simultaneous actuation of the switches 2a, 2b and 25, as is preferred.

The choice of the type of change over of the switches 2a, 2b and 25 depends also on whether precise coordination of time or maximum addressing speed is desired. For example, the switches 2a, 2b may be closed and switch 25 may be opened, if the voltage at the current source 4 is on the same level, as the voltage emitted by the controller (70a or 70b in FIG. 3) and applied to line 18a or 18b, to reach maximum addressing speed. Alternatively, a predetermined delay 66 is used to cause, after closing the switch 2a, the switch 2b to be also closed and the switch 25 to be opened (for isolating the electronic components of the node unit 30 from any charge supply, for which reason the current sources 4 and 22 will begin their function), as may be derived from diagrams S2a, S2b and S25, by which a more precise coordination of time of the functions is attained.

Comparing the diagrams UC4 and UC22, there is a certain similarity, and differences result from the voltage drop, particularly in and around the period 61, follows a different time constant, which is due to the fact, that the discharge of the two condensers 4 and 22 occurs through the energy drop over the circuit 28, 23 and the evaluating circuit 14, which after addressing is switched over to the energy saving "sleep" mode. In this context, diode 21 serves for decoupling.

With the help of diagram UC22 it is apparent that after opening the switch 25, the evaluating circuit, for saving current, passes over into the "sleep" mode, from which it is activated only at regular intervals 64 for sampling, storing and processing sensor data delivered via the lines 10 and 11. Each sampling consumes, of course, more energy, and for this reason the curve is wavier in the range 62, i.e. with each sampling it exhibits a significant drop, after which voltage decreases only slowly after return to the "sleep" mode. The wavy curve 63 corresponds to this curve progression, which has to be energized, in the first instance, by condenser 4. This curve 63, however, in comparison with the curve 62 (diagram UC22), decreases less, because with the decrease of charge of condenser 22 below the voltage of the voltage storage 4, the diode 21 opens and puts the charge reserve of the voltage storage 4 at the disposal of condenser 22. It should be mentioned that a relative low critical voltage 60 exists for the evaluation circuit 14, up to which it remains operative.

Looking at FIG. 3 brought up already repeatedly, the invention is preferably applied to a circular circuit, as has been suggested in the already mentioned WO 2009/065236. Though this is preferred, it is by no means forcibly necessary. If only one controller (head computer) 70a is provided, it will for example have only the node units 80-1 to 80-3 (group 101), 81 and 80-6 to 80-8 (group 103) on the line 18 and will them sample one after the other, after which it restarts e.g. at the beginning. Of course, the pair of switches, particularly in such a case, may be replaced by a single switch in common with a single control line 7, wherein in some cases, in favor of this simplified embodiment, worsened performance data have to be accepted, which could consist in that the charge transfer from the current storages 4 and 22 is less effective. The switch 25, however, is preferably connected to the cathode point K (FIG. 4) in common of the two diodes 1a, 1b. On the other hand, switch 2 and diode 1 will be realized, in practice, in the form of a MOSFET switch, wherein both the function of a diode as well as that of a switch is contained.

With such a circuit, the changeover device of the node unit 30, of course, will be simplified; because in this case only the switch 2a (or only 2b) and the switch 25 would be necessary, and since the circuit can, in general, be operated such, that the switch 2a is open, when the switch 25 is closed, this pair of switches could be realized as a simple changeover switch, for example of the type of a bistable multivibrator.

The advantage of a circular circuit, as shown, i.e either with two controllers 70a, 70b or with a single controller which has the connection 71b of the last node unit 80-8 directly connected to a second connection (not shown) to the lines 71 and 72 and is led back to the controller 70a, consists in the fact that with a failure of a node unit, e.g. the node unit 80-3, the remaining following node units 81 and 80-6, 80-7, 80-8 are not excluded from sampling or cut off the connection to the controller 70a. Each node unit, e.g. 30 of FIG. 1, may then sampled rather from side B and also from side A, thus, by the controller 70b, so that the failure of the node unit 80-3 results only in a data loss from that place, from which the node unit 80-3 receives its sensor signals. In such a case of addressing from two controllers 70a, 70b, it is suitable, if controller 70b signalizes its readiness state to the controller 70a, for example by a special operating signal over the interface (or router or Modem) 83 and the connection 73a, the operating signal being optionally a relative short pulse of high voltage, e.g. similar to pulse U2 (FIG. 2a), e.g. however of shortened duration.

Of course, communication between two controllers connected to the same line can also be made via lines 71 and 72, as will be explained later with reference to the description of FIG. 5.

According to this, the two controllers 70a, 70b are able to enter a dialogue for exchanging data, wherein for example controller 70a takes the role as a leader (compiling, evaluating, and memorizing the data delivered to it by controller 70b). This readiness signal from the side of controller 70b results also in the fact that controller 70a does not suffer a superfluous current flow over line 18. The data exchanged in such a dialogue may be the sampling interval, the definition of a regular sampling, deficiencies in node units addressed 80-1 to 80-8 and 81 or their failure. This particularly important, if according to a preferred embodiment, the two controllers 70a, 70b operate alternately, wherein they will be informed about the algorithm to be applied for data 43-1 to 43-n (FIG. 2a).

If such alternating operation takes place, it is suitable, if a signal is delivered at the respective output 75a, 75b which is contrary to the rest condition, by which an indicator is able to indicate, via the respective interface 78a or 78b, the beginning of the operating state, so that one is sure that no malfunction has occurred. The indicator, in principle, may be of any kind, thus for example an acoustic one, but an optical indicator is preferred. In the case of a display, it could be used to indicate, which node unit shows partial or complete failure.

If both controllers 70a, 70b are operating, and one of them determines first an erratic behavior (or no one at all) of a node unit, e.g. due to a short circuit between the lines 17, 18 in its area, or due to rupture of a line, the controller concerned stops its addressing activity, gives a "currentless" signal via line 75 and makes the respective other controller operate further. However, it is preferred, if after the time usual for addressing all node units, that controller, which detected the malfunction, begins to address anew at least for those faultless node units on its side up to the malfunctioning node unit. Thus, it is only the malfunctioning unit which remains isolated, whereas the other ones are sampled either by controller 70a or by controller 70b. It has already been said, that this inversion of direction could also be carried out by a single controller which is connected to both ends of the circle of node units.

In general, the controllers 70a, 70b will be equipped in the same manner, but within the scope of the invention, this is by no means necessary. In accordance with the application, the two controllers 70a, 70b may be different in structure and/or in software. Both controllers 70a, 70b are supplied with voltage via a voltage source 82 and connections 77a, 77b. However, one can do without this voltage supply, if the power supply is effected via the respective information connection 73a and 73b, as it is often the case if the Ethernet standard is applied to the information connection 73a and 73b, which is known as POE (Power Over Ethernet). In the case, however, that a separate voltage source 82 is used, it is clear that lines 17, 18 have to be isolated from it.

A further particularity of the circuit shown consists in the use of a node unit 81, which changes over either due to a signal of controller 70a or due to a program provided in it, and which supplies the addressing signals coming through the line 18 once to a group 102 having node units 80-4, 80-5 over a connection 15c, and the next time to the group 103 formed by node units 80-6 to 80-8. This corresponds to an operation as has become known from DE 199 02 490. In such a case, the node unit 81 and its changeover device, besides the switches 2a, 2b and 25, has still a further switch, which is in circuit with a diode, may lead to the connection 15c, and which is connected with its diode to the point in common between the cathodes of the diodes 1a, 1b (FIG. 1), wherein the controller, for actuating this switch, emits a signal, different to the signals already explained (e.g. a particularly short pulse or a pulse of particularly high voltage), which is taken by the signal sensors 12, 13, and is delivered to the evaluation unit 14, which in turn, in addition to its control outputs 7a, 7b, has a further control output for this switch. In each case, however, the number of node units 80, 81 is, in principal, not limited, and in each case it is conceivable, that the evaluation circuit 14 is programmed so that, after sampling the group 101 and addressing the node unit 81, it dials first group 102 and switches over to group 103 after the end of sampling.

The above explanation shows that the respective node unit may be provided with a single switch 2a, optionally with a separate switch 25 (or formed by a single changeover switch), with two, three or even still more switches of the changeover device. In this way, the node unit 81, for example, could dial a further group connected to it in addition to group 102 by means of an additional switch. To this end, the unit 81, for example, could receive a pulse coded signal from controller 70, or could dial group 102 by means of a long address pulse (similar to pulse 49a of FIG. 2a), but dial group 103 by emitting a short address pulse.

An interface 78a or 78b may each be associated to the controllers 70a, 70b, which in the present case comprises three inputs 74a, 75a, 76a as well as 74b, 75b and 76b, although any number of inputs could be provided in accordance with the requirements. Thus, a signal may be delivered to the interface 78 (a or b) via the line 74 by the controller 70 then, when it is desired to indicate, that the controller has completely failed and is no longer able to sample the node units 80-1 to 80-8.

Over line 75 comes the message, if only part of the system has failed, the signal coming over line 75 being optionally modulated such, that also a statement can be made, which part has failed and/or how to remedy it. An example for a message coming over line 75 may be the fact that one node unit 80-1 to 80-8 or 81 cannot be addressed, which means that it is damaged or has failed for another reason. Just in such a case, the circular circuit shown proves its worth, because then the node units at left and at right of the failed node unit, which still are functioning, can be sampled. Another reason for a signal over the line 75 may be a short circuit between the lines 17, 18 or an interruption of one of these lines.

The signal of the line 76 serves for signaling exceptional situations, if the controller determines a certain situation, in the case of presence sensors, for example, the presence of a burglar. An observation person or a security guard may then be alarmed over line 76 of such an interface 78, while at the same time the controller activates, for example, the actor diode 24 (FIG. 1) over lines 17, 18 for releasing counter measures (e.g. blocking or latching doors). In any case, the number of lines and of information passed by the interface 78 is not limited. As has already been stated, the connections 71 to 76 are suitably free of potential.

Still a further possibility is disclosed in FIG. 3: an interface 83 may be provided over connection 73b for connecting with the internet www. However, there is no need for a special interface 83, if the controller itself is structured for an internet connection www. As may be seen, it is suitable for some applications, if the controllers 70a, 70b are interconnected, for example for purposes of synchronization or for exchanging information. This can be done, for example, via interface 83 and the connection 73a. In this case, the interface 83 imparts also the access of the controller 70a to the internet, i.e. via connection 73a and interface 83 to the internet connection www.

Just if the individual node units 30, 80-1 to 80-8, 81, 30a are connected to the line 18, as may be seen in FIGS. 1, 3 and 4, by detachable connections 18a, 18b and via detachable connections 17a, 17b to the line 17 (vide FIGS. 3 and 4), the possibility is facilitated to insert individual node units according to the requirements or to take some out. In this respect one refers to the patent application of the same applicant simultaneously filed. Of course, addition of a node unit could also be realized without detachable connections 17a, 17b, 18a, 18*b* by simply disconnecting the respective line 17 or 18, but such a procedure is somewhat precarious.

If, for example, a node unit is inserted into the circle of node units or into group 102, inserting an appropriate piece of cable 17, 18 which, thus, extends the line 17 and 18, the controller 70*a*, 70*b* will first appreciate it as a "defect". For such a case, the addressing program of the controllers 70*a*, 70*b* is suitably developed such that they emit a further address signal, when addressing the last node unit, e.g. of group 101 or 103, so as to attempt, whether there is a further node unit (which was not there before). Only when the controllers 70*a*, 70*b* have recognized that there is a new node unit, the number of node units to be addressed is revised and is communicated to the other controller (if existing) via the line reaching from 73*a* to 83 (or vice versa).

If two controllers 70*a*, 70*b* address each beyond the last node unit, a "collision" is possible, i.e. address signals of both controllers reach one node unit. This principally undesirable situation is reported from the node unit or its circuit 14 to the respective controller, which takes it as a confirmation that the number of node units to be addressed is still correct.

Detection of a possible collision is effected in that node unit, which is just addressed during collision. To this end, it is only necessary, that it measures voltage at both voltage sensors 12*a*, 13*a* and 12*b*, 13*b* (FIG. 1) and not only at one of the two voltage sensors. This indicates that a controller (70*a*, 70*b*) is just attempting to address from both sides. The detecting node unit is then able to report this situation to the controller(s) by a specially coded response via modulator 20.

Referring to FIGS. 3 and 4, in both figures is a reception circuit 90 is illustrated for that of the actor diode 24 (FIG. 1). Via the output signal at terminals 94, 96 of the reception circuit, the actors already enumerated as an example (quench valve, protecting barriers, and burglar alarm signals) may be activated. In the case of FIGS. 3 and 4, the light emitting diode (LED) of the node unit 80-6 or 30*a* is designated 31 instead of 24. This diode 31 is encased in a translucent cable jacket 84 so that its light may leave the cable that includes the lines 17, 18 without any problem. A photoelectric transducer 91 is opposite the light emitting diode 31 and, for example, is formed by a PIN diode, alternatively by a phototransistor. With this, modulated or pulse width altered signals, for example, (e.g. corresponding to signals 49*a*, 49*b* of FIG. 2*a*) emitted by diode 31 can be received by the receiver circuit 90 via transducer 91, and a corresponding activation signal is delivered to the element to be activated, as has been enumerated as an example in brackets, via terminals 94, 96.

The light emitting diode 31 may absolutely emit signals through the translucent jacket of a connecting cable 84, or it can be connected to the receiving part 91 via a light guide, which connects it with the exterior.

In the case of FIG. 4, an example of such a receiver circuit is illustrated in detail. In it, the transducer 91 is connected to a discriminator circuit 98, which is formed to recognize the signal emitted by diode 31, provided that this signal is not a "digital" one. i. e the diode 31 is switched on or is not switched on. For example, the diode 31 emits alternatively a short signal, which for example corresponds to signal 49*b* of FIG. 2*a*, or a long one, which for example corresponds to signal 49*a*, to indicate functioning of the node unit or the occurrence of a defect. With normal periodic addressing of the node unit 30*a*, the discriminator 90 will receive a signal of the diode 31 at periodic intervals and will recognize it as a well functioning operation of the node unit 30*a*. If the longer signal 49*a* shall indicate a fault either within the node unit 30*a* or an extraordinary sensor signal, the circuit 98 will be suitably constructed as a pulse width discriminator, thus recognizing the broader pulse, which indicates the respective fault or the extraordinary event, and will deliver a corresponding signal to output 94 or 96. If the pulses of the diode drop out completely, then the discriminator 98 will, for example, close the switch 100 (fault position), in which contacts 94*a*, 94*b* are preferably in powerless condition.

The discriminator 98 may be designed in such a way that it measures the number of addressings or their interval during several cycle periods, e.g. by a clock generator and a counter in series, and then holds it in a memory. This cadence may be indicated to the exterior, e.g. by a display. The switch 100 is opened only after memorizing. At the same time, the result of discrimination is reported by circuit 98 via outlet terminals 96*a*, 96*b* to an external device, e.g. a display, a light emitting indicator or to another actor. In the case of the mentioned pulse width discriminator 98, the switch 101 is opened or closed depending on the pulse width received and determined which results in a simple signal at the outlet 96. As is the case with the switches 2*a*, 2*b* and 25 (FIG. 1), the switches 100 and 101 will normally be electronic switches. If several actors are connected to the receiver circuit 90, a digital signal will not be sufficient, and one has to utilize more complicated signal modulation.

In an embodiment which is preferred, because it is constructively and operatively simple, power supply for the receiver circuit 90 is derived from those contacts, to which switches 100 and 101 are connected, and to which diode circuits 99*a*, 99*b*, shown as an example, are connected, which provide the positive and the negative inlet 92 and 93 of the discriminator circuit 88.

It should be mentioned that the output 96 of the receiver circuit can be returned to a controller 70*a* and/or 70*b*, instead to an actor, thus controlling, whether the node unit concerned and addressed works properly. This facility is of special importance for security systems. For example, the receiver circuit 90 may return its output signal to the line 10 (FIG. 1), from where the signal is passed via evaluating circuit 14 directly to the lines 17, 18 and to the controller 70 (a and/or b).

It should be pointed out that FIG. 4 shows a variant 30*a* to the circuit of node unit 30 (FIG. 1). In this embodiment, the modulator transistor 20 with its collector is connected to the cathode in common K of both diodes 1*a*, 1*b* via the normally closed switch 25 and the normally opened switches 2*a*, 2*b*, which is preferred.

The charge storage 22, in this case, is not decoupled by diode 21 (FIG. 1) against negative voltage in line 18*a*, 18*b*, but by a resistor in series 28, which ensures sufficient feed-in for the evaluating circuit 14, the sensor lines 10, 11 and the inputs 8, 9 being not shown for the sake of simplicity. In any case, this type of circuit is more cost-effective.

Another difference to the circuit of FIG. 1 consists in that both lines 17 and 18 are connected to node unit 30*a* via detachable terminals 17*a*, 17*b*, 18*a*, 18*b*. In comparison with FIG. 3 one sees there, that in some cases a single detachable terminal 17*a* is sufficient. It has already stated above, that it is advantageous, if possible tensile stresses in longitudinal direction of the line 17 do not have an effect to the position of the node unit, and therefore, it is favorable, if one of the lines 17, 18, and in the case of FIG. 1 it is line 17, is fixedly connected to the node unit. However, inserting further node units into the lines 17, 18 is made more difficult and, moreover, tensile safety can be achieved by other means, as is explained in the patent application of the same applicant simultaneously filed. Which one of the two approaches will be used, depends on the application. The embodiment shown in FIG. 4 is particularly adapted to exchanging digital signals or also for systems, where not only one connection to the controller 70*a* or 70*b* exists, but optionally still further appliances shall be connected to the line and the node unit(s).

In FIG. 5, a preferred embodiment of a controller 70 applied in the invention is shown, which, on the one hand, is connected to lines 71 and 72 and, on the other hand, to the interface 83 for Internet (see FIG. 3) via connection 73. This connection 73 is directly connected to a processor 110, so that the controller 70 can enter into a data exchange with the internet connection www (see FIG. 3). To an output 112 of the processor 110, a modulator circuit 111 is connected which, basically, may be formed equally or similarly as the modulator circuit 19, 20 of FIG. 1, and which enables the controller to respond about in the same manner as a node unit 30. In this way, a data exchange may take place between the two controllers 70*a*, 70*b* (FIG. 3), connected to opposite ends of the circuit, even via the lines 71, 72.

Via a control output 117, the processor 110 is connected to a switch 114 for controlling it. Preferably, this switch is normally open, the processor 110 pausing with opened switch 114 over a period, which corresponds to that, in which the groups 102, 103, 104 and 81 (FIG. 3) have completely been sampled by addressing them. In this case, it is advantageous, if the controller 70 (e.g. 70*a* in FIG. 3) sends a special code to the other controller (e.g. 70*b* in FIG. 3) by driving the modulator 111.

Between the lines 71 and 72 is also an analogue-to digital converter 113, the output of which being connected to a data input 119 of the processor 110. If the processor determines that a voltage is present at the data input 119 (and consequently between the lines 71 and 72), it concludes that the respective other controller at the opposite end of the arrangement has completely addressed through. The receiving controller answers by leaving the switch 114 open and driving the modulator 111 to signalize its readiness to the sending controller.

By a specially coded signal, the sending controller can either begin itself the cycle anew or can request the receiving controller to address the arrangement of node units. In the latter case, the sending controller will open its switch 114, and the receiving controller will close its switch 114.

Depending on the adjustment, the processor 110 may, for example, begin with sampling the groups 102 to 104 and 81 by closing the switch 114 via the control output 117. In this way, the circuit of the node units 80-1 to 80-8 and 81 (see FIG. 3) is supplied with voltage (cf. the voltage signals of FIG. 2*a*), which is delivered from the processor 110 by a data bus 118 to a digital-to-analogue converter 115, and suitably via a buffer 116, to the line 71. This means that the processor 110 modulates the voltage present in the line 71 and produces the signal waveform required for addressing the arrangement through, by activating the digital-to-analogue converter 115 via the data bus 118.

In doing this, the current consumed by the circuit of node units 80-1 to 80-8 and 81 (FIG. 3) is always measured, over which the data are sent from the node units back to the controller 70 and the processor 110 (cf. the current diagram of FIG. 2*a*). Measuring current, in this example, is done via a resistance 120, connected to the line 71 through the closed switch 114, and a differential amplifier 121, the inputs of which are connected before and after the resistance 120. The output of the differential amplifier 121, via an analogue-to digital converter 122, reaches a data input 123 of the processor 110, which receives the current signals (FIG. 2*a*) and evaluates them.

Numerous modifications are possible within the scope of the invention; for example, the signal sensors 12, 13 have not necessarily to be connected permanently to the lines 17, 18*a*, 18*b*, but could be time controlled by a clock generator of the evaluating circuit 14 to be connected to these lines or disconnected. Though the current source will, preferably, be a current storage member (accumulator or condenser), but could for some applications be formed by a photovoltaic cell or a similar photoelectric transducer.

FIG. 6 shows a circuit, further simplified in comparison with FIG. 4, in accordance with the present invention, which does with two switches 2*a*, 2*b* only. The diodes 1*a* and 1*b* assume the insulation of the current reserves in the current storages 4 and 22.

This insulation can only become effective, if the diodes are in reverse direction in the circuit. Therefore, the data transmission towards the controller has to be placed into that part of the signal, in which the voltage of the combined supply and data transmission line, which exists between the contacts 17 and 18, is smaller than the voltage at the storage element 4.

Thereby, modulation by the elements 19 and 20 is not affected. A further simplification is represented in FIG. 6, which consists in that data are transmitted only in the direction of a side B. This involves a reduction of the necessary elements, which is gained by the disadvantage, that the arrangement cannot be operated to both sides 101, 103 (as in FIG. 3), but as a spur feeder 102 only (see FIG. 3).

In this arrangement, the supply of the circuit 14 is regenerated always, when the voltage between the contacts 17 and 18 is larger than that which exists at the storage element 4.

Though this embodiment has the advantage to work with one switch less, but has the disadvantage in relation to those of FIG. 1 and FIG. 4, that long charge times will result when growing the voltage between the contacts 17 and 18, if many modules 30 are connected in series. Thereby, strong slowing-down of that cadence may occur, with which the arrangement can be addressed through. The worsening of performance data, involved with the slow cadence, in a system with many modules 30 according to the invention is, thus, the greater, the more current is consumed by the module 14.

Thus, it is advantageous to split the module 14 up into two parts, which are preferably designed in CMOS technology. Since part of the component 14 is a micro-controller, it is preferably implemented as a synchronous logic, which has a 'clock' signal (clock signal). Since CMOS components consume current substantially only when changing from one logic state into another one, this part of the component 14 comprises those circuits, which consume much current. The other part of the circuit 14 comprises all asynchronous logic functions, which change the state relative rarely and, therefore, it can be designed in a manner that it consumes only extremely little current.

In FIG. 7, an embodiment of the invention in accordance with this consideration is represented and comprises an addressable unit 30, the logic of which is separately built-up in the form of a synchronous logic component 14*a* and an asynchronous logic component 14*b*.

The two components are interconnected by a bidirectional data bus 32. The component 14*a*, at terminal 37, is connected to an external oscillator or clock generator 36 which is needed for the synchronous logic. Apart from its connection 6 for negative supply and voltage supply 5*a*, it does not need other connections, because the whole function is handled over the data bus, by which it controls the asynchronous logic component 14*b*. Of course, the clock generator, here designed as being external, can also be an element of the synchronous component 14*a*.

The supplied voltage is controlled by a voltage regulator which is in the asynchronous component 14*b*, and is delivered through its output line 5*b*, to which a smoothing condenser 22 is connected. While the synchronous component, at its input 5a, is thus supplied with controlled voltage, the asynchronous logic component 14b obtains its supply directly from lines 17 and 18a or 18b. Since this component is preferably designed in CMOS technology and, therefore, consumes extremely little current, it comprises its own supply network, which is separated from that of the synchronous logic component and consists of diodes 33a and 33b as well as the storage element 35. This network obtains its supply always from lines 17 and 18a or 18b, wherein a charge from the line is received only, if the voltage between the lines 17 and 18 is higher than that in the storage element 35 in a similar way as has been described with reference to FIG. 6. Due to the little current consumption of component 14b, this does not lead to a substantial detriment of the power data of the system. Of course, here also a switched delivery of supply can be applied, as has previously been described (FIG. 1 or FIG. 6). However, due to the extremely little current consumption of the component, this will, in general, not be necessary.

Through its input 34, the asynchronous logic component 14b obtains the voltage for the supply of the synchronous component 14a (through line 5a/5b). Through its input 6, it is connected to the negative line 17. Preferably, the component 14b comprises also the driver circuits for activating the switches 2a and 2b as well as 25. This is done through its outputs 7 and 27. These as well as the diodes 1a and 1b have the same functions, as in the previous description. In the present embodiment, the driver only is controlled by a command of the synchronous component 14a, which is communicated through the bus 32. Therefore, a converter of the logic voltage level between the voltage 5a and the internal logic voltage level of 14b is suitably provided at the input of the data bus 32 of the asynchronous component 14b which, in general, will depend on the supplied voltage at the input 38. The component 14b sends also condition messages via the bidirectional bus 32 to the synchronous logic component 14a, which is in need of it to control the data stream.

The modulator circuit 19 and 20 (FIG. 6) may be comprised in the asynchronous logic component 14b. In this case, it has to have, of course, terminals which connect it directly to the lines 18a and 18b. In the embodiment of FIG. 7, a variant as in FIG. 4 has been chosen, where such terminals are not necessary, and modulation is effected through the terminal 38 in common. Type and signal shape of the modulation is controlled by the synchronous logic component 14a through the data bus 32.

Determination of the respective logic state is effected in the asynchronous logic component 14b via its inputs 3a and 3b, which are connected to the lines 17, 18 via the voltage dividers 12a, 12b and 13a, 13b.

It goes without saying that most of the components of FIG. 7 can also be an element of the asynchronous logic component; particularly 33a, 33b, 12a, 12b, 13a, 13b as well as the switch 25.

The invention claimed is:

1. Addressable node unit comprising:
a first and a second connection for at least a first and a second line, through which the node unit is addressable, said connections being connected to an evaluating circuit useable to evaluate an addressing signal, wherein a first switch is associated with the first connection and a second switch is associated with the second connection, wherein the first and the second switch are arranged so as to establish, in a closed state thereof, an electrical connection between the first and the second connections, the switches being by-passed by respective diodes with a cathode in common between the at least first and second lines so that a signal flow is possible in two directions; and
at least one current source, supplyable with current through at least one of the at least first and second lines, wherein a further switch is connected to the cathode, in common with the two diodes, between the evaluating circuit and a corresponding one of the first and second connections, the further switch being opened after addressing so that current supply to the evaluating circuit is ensured, after addressing, by the at least one current source and data thereafter is exchangeable between the evaluating circuit and the node unit.

2. The addressable node unit of claim 1, wherein the evaluating circuit comprises two components, one of the two components being designed as a synchronous logic which disposes of a clock signal of a clock generator, and the other of the two component comprising asynchronous functions and its own supply network, separate from that of the synchronous logic component, which includes diodes and a storage element and obtains its supply directly from the at least first and second lines, wherein a charge is obtainable from the at least first and second lines if a voltage between the at least first and second lines is relatively higher than that in the storage element.

3. The addressable node unit of claim 1, wherein the further switch, connected to the cathodes in common of the two diodes, is a transistor switch.

4. The addressable node unit of claim 3, wherein the transistor switch is a metal-oxide-semiconductor field effect (MOSFET) transistor.

5. The addressable node unit of claim 1, wherein the addressable node unit is formed with two signal sensors for signals from two different directions.

6. The addressable node unit of claim 5, wherein at least one of
the evaluating circuit is formed with at least one control output for switching over the direction of at least one of transmitting and receiving; and
the evaluating circuit is provided with a transistor with a respective collector line for each one of the directions for emitting signals in both directions.

7. The method of claim 6, wherein, for passing addressing from one of the at least two node units to another of the at least two node units, each of the at least two node units comprises, apart from the further switch, a first and a second switch by-passed by diodes with a cathode in common, wherein the further switch is connected to the cathode in common, and wherein actuation of the first and second switches for charging at least one current storage is effected in a time-delayed manner.

8. The addressable node unit of claim 1, further comprising:
at least one signal sensor, permanently connected to the at least first and second lines independently from said further switch.

9. The addressable node unit of claim 1, wherein the first and second switches by-pass an unaddressed node.

10. The addressable node unit of claim 1, wherein the at least one current source is isolated from the first line and the second line when the further switch is open.

11. A method for addressing at least two node units via at least one controller, the method comprising:
emitting a first addressing signal, via the at least one controller, to a first node unit of the at least two node units, the first addressing signal being delivered to an evaluating circuit connected to the first node unit;

interrupting passage of the first addressing signal to a second node unit of the at least two node units;

emitting, via the controller, a second addressing signal which is different from the first addressing signal, subsequent to the interrupting, by which connection is made to a respective next node unit of the at least two node units, the interrupting of passage of the first addressing signal to the evaluating circuit connected to the first node unit being achieved via a switch, opened after addressing such that the first addressing signal of the controller subsequently addresses the second node unit, connection between the controller and the evaluating circuit connected to the first node unit being reestablishable for subsequent addressing via a reset signal; and interrupting addressing of the respective next node unit, via a further switch connected to cathodes in common with two diodes between the evaluating circuit and corresponding line connections.

12. The method of claim 11, wherein at least the first addressing signal is a voltage signal.

13. The method of claim 12, wherein the second addressing signal is a voltage signal, and wherein amplitudes of the first and second addressing signals are different.

14. The method of claim 13, wherein, for passing addressing from one of the at least two node units to another of the at least two node units, each of the at least two node units comprises, apart from the further switch, a first and a second switch by-passed by diodes with a cathode in common, wherein the further switch is connected to the cathode in common, and wherein actuation of the first and second switches for charging at least one current storage is effected in a time-delayed manner.

15. The method of claim 12, wherein, for passing addressing from one of the at least two node units to another of the at least two node units, each of the at least two node units comprises, apart from the further switch, a first and a second switch by-passed by diodes with a cathode in common, wherein the further switch is connected to the cathode in common, and wherein actuation of the first and second switches for charging at least one current storage is effected in a time-delayed manner.

16. The method of claim 11, wherein a current of the first addressing signal is supplied to at least one current storage for charging the first addressing signal.

17. The method of claim 16, wherein, for passing addressing from one of the at least two node units to another of the at least two node units, each of the at least two node units comprises, apart from the further switch, a first and a second switch by-passed by diodes with a cathode in common, wherein the further switch is connected to the cathode in common, and wherein actuation of the first and second switches for charging at least one current storage is effected in a time-delayed manner.

18. The method of claim 11, wherein, for passing addressing from one of the at least two node units to another of the at least two node units, each of the at least two node units comprises, apart from the further switch, a first and a second switch by-passed by diodes with a cathode in common, wherein the further switch is connected to the cathode in common, and wherein actuation of the first and second additional switches for charging at least one current storage is effected in a time-delayed manner.

* * * * *